United States Patent
Osafune et al.

(10) Patent No.: US 12,516,275 B2
(45) Date of Patent: Jan. 6, 2026

(54) COMPOSITION; CLEANING AGENT, AEROSOL COMPOSITION, DRAINING AGENT, FOAMING AGENT, OR HEAT-TRANSFER MEDIUM CONTAINING THE COMPOSITION; SYSTEM USING THE HEAT-TRANSFER MEDIUM; AND METHOD OF CLEANING ARTICLES

(71) Applicant: Central Glass Company, Limited, Ube (JP)

(72) Inventors: Kanako Osafune, Kawagoe (JP); Hideaki Imura, Kawagoe (JP)

(73) Assignee: Central Glass Company, Limited, Ube (JP)

( * ) Notice: Subject to any disclaimer, the term of this patent is extended or adjusted under 35 U.S.C. 154(b) by 291 days.

(21) Appl. No.: 18/374,774

(22) Filed: Sep. 29, 2023

(65) Prior Publication Data

US 2024/0043777 A1 Feb. 8, 2024

Related U.S. Application Data

(63) Continuation of application No. PCT/JP2022/014889, filed on Mar. 28, 2022.

(30) Foreign Application Priority Data

Apr. 9, 2021 (JP) ................ 2021-066672

(51) Int. Cl.
| | | |
|---|---|---|
| C11D 7/00 | (2006.01) | |
| C09D 4/00 | (2006.01) | |
| C09K 3/30 | (2006.01) | |
| C11D 7/30 | (2006.01) | |
| C11D 7/50 | (2006.01) | |

(52) U.S. Cl.
CPC ............ *C11D 7/30* (2013.01); *C09D 4/00* (2013.01); *C09K 3/30* (2013.01); *C11D 7/50* (2013.01)

(58) Field of Classification Search
CPC ........ C11D 7/30; C11D 7/50; C11D 7/5045; C09D 4/00; C09K 3/30; C09K 5/04; C09K 5/045; B08B 3/04; C07C 19/10; C07C 21/18; F25B 1/00
USPC ........................................... 510/412
See application file for complete search history.

(56) References Cited

U.S. PATENT DOCUMENTS

| | | | | |
|---|---|---|---|---|
| 5,158,617 A | * | 10/1992 | Li | ............... C08J 9/144 134/40 |
| 5,316,690 A | * | 5/1994 | Li | ............... D06L 1/02 134/40 |
| 6,759,381 B1 | * | 7/2004 | Johnson | ............... C11D 7/5045 570/123 |
| 2002/0142927 A1 | * | 10/2002 | Pham | ............... C07C 17/00 510/415 |
| 2006/0142173 A1 | | 6/2006 | Johnson et al. | |
| 2011/0270001 A1 | | 11/2011 | Ishihara et al. | |
| 2013/0109771 A1 | | 5/2013 | Hulse et al. | |
| 2016/0230059 A1 | | 8/2016 | Takahashi et al. | |
| 2016/0230060 A1 | | 8/2016 | Takahashi et al. | |
| 2017/0297982 A1 | | 10/2017 | Deur-Bert et al. | |
| 2018/0056210 A1 | | 3/2018 | Pokrovski et al. | |
| 2018/0215689 A1 | * | 8/2018 | Kitamoto | ............... B01J 21/04 |
| 2021/0032898 A1 | * | 2/2021 | Yang | ............... E04H 15/60 |

FOREIGN PATENT DOCUMENTS

| | | |
|---|---|---|
| JP | 2010-202640 A | 9/2010 |
| JP | 2013-87066 A | 5/2013 |
| JP | 2014-24821 A | 2/2014 |
| JP | 5477011 B2 | 4/2014 |
| JP | 2015-507039 A | 3/2015 |
| JP | 2016-69371 A | 5/2016 |
| JP | 2016-69634 A | 5/2016 |
| JP | 2016-79224 A | 5/2016 |
| JP | 2016-222647 A | 12/2016 |
| JP | 2017-504604 A | 2/2017 |
| JP | 2017-43742 A | 3/2017 |
| JP | 2018-21199 A | 2/2018 |
| JP | 2018-39799 A | 3/2018 |
| WO | WO 2013/096727 A1 | 6/2013 |
| WO | WO 2019/102967 A1 | 5/2019 |

OTHER PUBLICATIONS

International Search Report (PCT/ISA/210) issued in PCT Application No. PCT/JP2022/014889 dated May 10, 2022 with English translation (7 pages).

Japanese-language Written Opinion (PCT/ISA/237) issued in PCT Application No. PCT/JP2022/014889 dated May 10, 2022 with English translation (9 pages).

Japanese-language Office Action issued in Japanese Application No. 2023-512948 dated Apr. 16, 2024 with English translation (8 pages).

* cited by examiner

*Primary Examiner* — Eisa B Elhilo

(74) *Attorney, Agent, or Firm* — Crowell & Moring LLP

(57) ABSTRACT

A novel hydrochlorofluoroolefin-based composition contains Z-1-chloro-3,3,3-trifluoropropene, 1-chloro-1,3,3,3-tetrafluoropropane, and water. In the composition, the proportions of Z-1-chloro-3,3,3-trifluoropropene, 1-chloro-1,3,3,3-tetrafluoropropane, and water are 55.00 mass % to 99.98 mass %, 0.01 mass % to 44.99 mass %, and 0.01 mass % to 10.00 mass %, respectively, with respect to the total amount of Z-1-chloro-3,3,3-trifluoropropene, 1-chloro-1,3,3,3-tetrafluoropropane, and water.

19 Claims, No Drawings

COMPOSITION; CLEANING AGENT, AEROSOL COMPOSITION, DRAINING AGENT, FOAMING AGENT, OR HEAT-TRANSFER MEDIUM CONTAINING THE COMPOSITION; SYSTEM USING THE HEAT-TRANSFER MEDIUM; AND METHOD OF CLEANING ARTICLES

CROSS-REFERENCE TO RELATED APPLICATIONS

This application is a Continuation of International Patent Application No. PCT/JP2022/014889, filed on Mar. 28, 2022, which claims the benefit of priority to Japanese Patent Application No. 2021-066672, filed on Apr. 9, 2021, the entire contents of which are incorporated herein by reference.

FIELD

An embodiment of the present invention relates to a composition. Specifically, an embodiment of the present invention relates to a composition containing Z-1-chloro-3,3,3-trifluoropropene (hereinafter, also referred to as HCFO-1233zd(Z) or 1233zd(Z)), 1-chloro-1,3,3,3-tetrafluoropropane (hereinafter, also referred to as HCFC-244fa or 244fa), and water or a composition containing 1233zd(Z), 244fa, dichlorotetrafluoropropene (hereinafter, also referred to as HCFO-1214 or 1214), and water. Alternatively, an embodiment of the present invention relates to a cleaning agent, an aerosol composition, a draining agent, a foaming agent, or a heat-transfer medium containing the aforementioned composition. Alternatively, an embodiment of the present invention relates to a system using the aforementioned heat-transfer medium.

BACKGROUND

Fluorine-containing compounds such as hydrochlorofluoroolefins (HCFO) and hydrochlorofluorocarbons (HCFC) have been widely used as a foaming agent, a heat-transfer medium, a solvent, a cleaning agent, and the like due to their high ability to dissolve a variety of solutes. In particular, hydrochlorofluoroolefins (HCFO) are one of the most useful environmentally friendly functional solvents because of their excellent environmental characteristics such as a short lifetime in the atmosphere and low global warming potential (see, Japanese Patent Application Publication No. 2018-039799, Japanese Patent No. 5477011, Japanese Patent Application Publication No. 2015-507039, US Patent Application Publication No. 2006-0142173, and Japanese Patent Application Publications No. 2017-043742 and 2013-087066).

SUMMARY

An embodiment of the present invention is a composition. This composition contains Z-1-chloro-3,3,3-trifluoropropene, 1-chloro-1,3,3,3-tetrafluoropropane, and water. In this composition, a proportion of Z-1-chloro-3,3,3-trifluoropropene, a proportion of 1-chloro-1,3,3,3-tetrafluoropropane, and a proportion of water are 55.00 mass % to 99.98 mass %, 0.01 mass % to 44.99 mass %, and 0.01 mass % to 10.00 mass %, respectively, with respect to a total amount of Z-1-chloro-3,3,3-trifluoropropene, 1-chloro-1,3,3,3-tetrafluoropropane, and water.

An embodiment of the present invention is a composition. This composition contains Z-1-chloro-3,3,3-trifluoropropene, 1-chloro-1,3,3,3-tetrafluoropropane, dichlorotetrafluoropropene, and water. In this composition, a proportion of Z-1-chloro-3,3,3-trifluoropropene, a proportion of 1-chloro-1,3,3,3-tetrafluoropropane, a proportion of dichlorotetrafluoropropene, and a proportion of water are 55.00000 mass % to 99.98989 mass %, 0.00010 mass % to 44.98999 mass %, 0.00001 mass % to 5.00000 mass %, and 0.01000 mass % to 10.00000 mass %, respectively, with respect to a total amount of Z-1-chloro-3,3,3-trifluoropropene, 1-chloro-1,3,3,3-tetrafluoropropane, dichlorotetrafluoropropene, and water.

An embodiment of the present invention is a method for forming a coating film of a component for forming a coating film on a surface of an article. The method includes applying a solution containing one of the above-mentioned compositions and a component for forming a coating film onto a surface of an article and volatilizing the composition.

DESCRIPTION OF EMBODIMENTS

Hereinafter, embodiments of the present invention are described. However, the embodiments of the present invention are not to be construed as limited to the following description of embodiments and examples.

1. Definition of Terms

The term "azeotropy" refers to azeotropy in the strict thermodynamic sense. For example, in the case of water and ethanol, a composition of ethanol (96 mass %) and water (4 mass %) is an azeotropic mixture (azeotrope), and the vapor that exists in vapor-liquid equilibrium with the mixture is also "ethanol (96 mass %):water (4 mass %)," which perfectly matches the liquid composition. This phenomenon is called "azeotropy," and an azeotropic mixture is called an azeotropic composition. At a specific temperature and pressure, the composition of the azeotropic is determined at only one point. Since the azeotropic composition volatilizes with the same composition as the liquid composition, it is a very desirable composition that does not change the liquid composition during use.

The term "azeotropic-like" refers to as a phenomenon in which a liquid composition and a composition of gas in equilibrium are substantially equal, although not exactly the same. Since compositions exhibiting such a phenomenon can be treated in the same manner as azeotropic compositions, azeotropic compositions and compositions exhibiting azeotropic-like phenomena may be collectively referred to as "azeotropic-like compositions". In this specification, an "azeotropic composition" refers to as a composition consisting of n (n is a natural number equal to or more than 2) components (or compounds) and exhibiting a lower boiling point than a composition (a single composition when n is 2) obtained by excluding the component having the highest boiling point from this composition. For example, if the boiling point of a composition consisting of three components, component A, component B, and component C (boiling point C>B>A) is lower than that of a composition consisting of the component A and the component B without component C having the highest boiling point, the composition consisting of these three components is an azeotropic composition. Azeotropic compositions include homogeneous azeotropic compositions that exist as a single liquid phase at a given pressure and heterophase azeotropic compositions that exist as two or more liquid phases at a given pressure. An azeotropic composition consisting of n components is called an n-component azeotropic composition. For example, an azeotropic composition consisting of three components is called a three-component azeotropic composition, and an azeotropic composition consisting of four components is called a four-component azeotropic composition. Note that the boiling point of a composition is the boiling point at 1 atm (101.3 kPa), i.e., the standard boiling point.

2. Three-Component Composition

An embodiment of the present invention is a composition consisting of 1233zd(Z), 244fa, and water. In this three-component composition, the proportion of 1233zd(Z) is 55.00 mass % to 99.98 mass %, the proportion of 244fa is from 0.01 mass % to 44.99 mass %, and the proportion of water is 0.01 mass % to 10.00 mass % with respect to the total amount of 1233zd(Z), 244fa, and water. The structural formulae of 1233zd(Z) and 244fa are as follows.

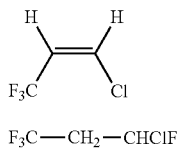

HCFO-1233zd(Z)

F₃C—CH₂—CHClF   HCFC-244fa

The boiling points of 1233zd(Z), 244fa, and water at 1 atm are 39° C., 42° C., and 100° C., respectively, and water exhibits the highest boiling point in this three-component composition. As demonstrated in the Example, the boiling point of the three-component composition consisting of 1233zd(Z), 244fa, and water with the above proportions is lower than that of a two-component composition consisting of 1233zd(Z) and 244fa with the same composition ratio. Therefore, this three-component composition exhibits azeotropic-like phenomena and can be referred to as a three-component azeotropic-like composition.

In this three-component composition, the proportion of 1233zd(Z) may be from 60.00 mass % to 99.98 mass %, the proportion of 244fa may be from 0.01 mass % to 39.98 mass %, and the proportion of water may be from 0.01 mass % to 5.00 mass % with respect to the total amount of 1233zd(Z), 244fa, and water. Alternatively, in this three-component composition, the proportion of 1233zd(Z) may be from 85.00 mass % to 99.98 mass %, the proportion of 244fa may be from 0.01 mass % to 14.98 mass %, and the proportion of water may be from 0.01 mass % to 2.00 mass % with respect to the total amount of 1233zd(Z), 244fa, and water. Alternatively, in this three-component composition, the proportion of 1233zd(Z) may be from 60.02000 mass % to 99.92000 mass %, the proportion of 244fa may be from 0.03000 mass % to 39.38000 mass %, and the proportion of water may be from 0.01000 mass % to 1.01000 mass % with respect to the total amount of 1233zd(Z), 244fa, and water.

3. Four-Component Composition

Another embodiment of the present invention is a four-component composition consisting of 1233zd(Z), 244fa, 1214, and water. In this four-component composition, the proportion of 1233zd(Z) is from 55.00000 mass % to 99.98989 mass %, the proportion of 244fa is from 0.00010 mass % to 44.98999 mass %, the proportion of 1214 is from 0.00001 mass % to 5.00000 mass %, and the proportion of water is from 0.01000 mass % to 10.00000 mass % with respect to the total amount of 1233zd(Z), 244fa, 1214, and water. The structural formulae of 1214 are as follows.

HCFO-1214

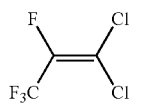 HCFO-1214ya

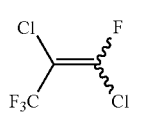 HCFO-1214xb

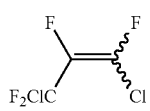 HCFO-1214yb

As shown in the above structural formulae, 1214 means 1,1-dichloro-2,3,3,3-tetrafluoropropene (hereinafter, also referred to as 1214ya), 1,2-dichloro-1,2-dichloro-1,3,3,3-tetrafluoropropene (hereafter, also referred to 1214xb), and 1,3-dichloro-1,2,3,3-tetrafluoropropene (hereafter, also referred to 1214yb). 1214xb includes cis and trans forms. Similarly, 1214yb also includes cis and trans forms. Thus, in this specification, 1214 is a generic term for the five isomers. 1214 included in the above four-component composition may contain only one of the above isomers, may contain a plurality of the isomers, or may contain all of the isomers. When a plurality of isomers is included, the composition ratio thereof is arbitrary. In addition, when 1214xb, which can take cis and trans isomers, is included, only one of the isomers may be included or both isomers may be included in any composition ratio. Similarly, when 1214yb, which can take cis and trans isomers, is included, only one of the isomers may be included, or both isomers may be included in any composition ratio.

The boiling points of 1233zd(Z), 244fa, 1214, and water at 1 atm are 39° C., 42° C., 43 to 48° C., and 100° C., respectively, and water exhibits the highest boiling point in this four-component composition. As shown in the Examples, the boiling point of the four-component composition consisting of 1233zd(Z), 244fa, 1214, and water in the above ratios is lower than that of the composition consisting of 1233zd(Z), 244fa, and 1214 in the same composition ratio. Therefore, this four-component composition exhibits an azeotropic-like phenomenon and can also be referred to as a four-component azeotropic-like composition.

In this four-component composition, the proportion of 1233zd(Z) may be from 60.00000 mass % to 99.98989 mass %, the proportion of 244fa may be from 0.00010 mass % to 39.98999 mass %, the proportion of 1214 may be from 0.00001 mass % to 5.00000 mass %, and the proportion of water may be from 0.01000 to 5.00000 mass % with respect to the total amount of 1233zd(Z), 244fa, 1214, and water. Alternatively, in this four-component composition, the proportion of 1233zd(Z) may be from 85.00000 mass % to 99.98999 mass %, the proportion of 244fa may be from 0.00010 mass % to 14.98999 mass %, the proportion of 1214 may be from 0.00001 mass % to 5.00000 mass %, and the proportion of water may be from 0.01000 mass % to 2.00000 mass % with respect to the total amount of 1233zd(Z), 244fa, 1214, and water. Alternatively, in this four-component composition, the proportion of 1233zd(Z) may be from 86.78000 mass % to 99.97699 mass %, the proportion of 244fa may be from 0.00260 mass % to 9.34000 mass %, the proportion of 1214 may be from 0.00001 mass % to 4.82000 mass %, and the proportion of water may be from 0.01690 mass % to 1.14640 mass % with respect to the total amount of 1233zd(Z), 244fa, 1214, and water. Note that, 1214 is preferred to be included at 10 mass % or less and is more preferably included at 5 mass % or less in view of its stability.

It is not always easy to predict the azeotropic properties of a composition containing a plurality of compounds which are liquid at room temperature, and it is extremely difficult to predict whether the composition forms an azeotropic-like composition and to predict the composition ratio to form an azeotropic-like composition, especially when compounds with significantly different boiling points are included. This tendency is particularly noticeable in compositions containing compounds without hydrophilic substituents such as hydrochlorofluoroolefin and polar solvents such as water, and it is impossible to judge unless the composition is actually prepared and the behavior thereof is examined. Moreover, this difficulty in prediction apparently increases as the variety of compounds in the composition increases, and azeotropy and the composition ratio to achieve the azeotropy can be found only through a considerable amount of trial and error. Therefore, this invention has an important technical significance in that it was found that this multi-component composition containing three or more compounds with significantly different polarity and boiling points exhibits an azeotropic-like phenomenon, and that the composition ratio for exhibiting the azeotropic-like phenomenon was identified on the basis of experimental results.

Since 1233zd(Z), 244fa, 1214, and water which constitute these three-component composition and four-component composition (hereinafter, these compositions are each referred to as the present multi-component compositions), have extremely low ozone depletion potentials and global warming potentials (GWP), they are less harmful to the global environment than the conventional compositions including only chlorofluorocarbons (CFC) or hydrochlorofluorocarbons (HCFC).

4. Additives

An embodiment of the present invention is a composition containing this multi-component composition. The composition may contain one or more other components together with the multi-component composition. As described below, the multi-component composition can be used for various applications, and other components may be added as additives depending on the application. Additives include, but are not limited to, lubricants, stabilizers, flame retardants, surfactants, metal passivators, organic solvents (except for 1233zd(Z), 244fa, and 1214), and injection gases. The amount of additives is adjusted according to the application. Hereinafter, an embodiment including additives is explained.

4-1. Lubricant

An embodiment of the present invention is a composition containing this multi-component composition and a lubricant. The lubricant may be, but is not limited to, mineral oil (paraffinic or naphthenic oil) and an alkyl benzene, a poly (α-olefin), an ester, a polyol ester, a polyalkylene glycol, a polyvinyl ether, of synthetic oil, and the like. A mixture of a lubricant and this multi-component composition can also be used as a heat transfer composition such as a refrigerant in a high-temperature heat pump and a working media in a Rankine cycle. The amount of lubricant may be selected from, but is not limited to, a range from 0.01 mass % to 20 mass %, from 0.01 mass % to 10 mass %, or from 0.01 mass % to 5 mass % of this multi-component composition, for example.

Alkylbenzenes include n-octylbenzene, n-nonylbenzene, n-decylbenzene, n-undecylbenzene, n-dodecylbenzene, n-tridecylbenzene, 2-methyl-1-phenylheptane, 2-methyl-1-phenyloctane, 2-methyl-1-phenylnonane, 2-methyl-1-phenyldecane, 2-methyl-1-phenylundecane, 2-methyl-1-phenyldodecane, 2-methyl-1-phenyltridecane, and the like.

Esters include aromatic esters such as benzoic acid, phthalic acid, isophthalic acid, terephthalic acid, trimellitic acid, pyromellitic acid, and mixtures thereof, dibasic acid esters, polyol esters, complex esters, carbonic acid esters, and the like.

Alcohols used as raw materials for the polyol esters include multivalent alcohols such as neopentyl glycol, trimethylol ethane, trimethylol propane, trimethylol butane, di(trimethylol propane), tri(trimethylol propane), pentaerythritol, di(pentaerythritol), and tri(pentaerythritol). Carboxylic acids used as raw materials for the polyol esters include valeric acid, caproic acid, enanthic acid, caprylic acid, peralgonic acid, capric acid, oleic acid, isopentanoic acid, 2-methylhexanoic acid, 2-ethylpentanoic acid, 2 2-ethylhexanoic acid, 3,5,5-trimethylhexanoic acid, and the like.

Polyalkylene glycols include compounds obtained by addition-polymerizing alkylene oxides (e.g., ethylene oxide, propylene oxide, butylene oxide, and the like) with alcohols having 1 to 18 carbons (e.g., aliphatic alcohols such as methanol, ethanol, linear or branched propanol, linear or branched butanol, linear or branched pentanol, and linear or branched hexanol).

Polyvinyl ethers include poly(methyl vinyl ether), poly (ethyl vinyl ether), poly(n-propyl vinyl ether), poly(isopropyl vinyl ether), and the like.

4-2. Stabilizer

An embodiment of the present invention is a composition containing this multi-component composition and a stabilizer. The addition of a stabilizer improves the thermal stability, oxidation resistance, and the like of this multi-component composition. Such stabilizers include, but are not limited to, nitro compounds, epoxy compounds, phenols, imidazoles, amines, hydrocarbons, and the like. These compounds may be used singly or in combination with two or more of these compounds. The amount of the stabilizer may be selected from, but not limited to, 0.01 mass % to 20 mass %, 0.01 mass % to 10 mass %, or 0.01 mass % to 5 mass % of this multi-component composition, for example.

Nitro compounds include, for example, aliphatic and/or aromatic derivatives. Aliphatic nitro compounds include, for example, nitromethane, nitroethane, 1-nitropropropane, 2-nitropropropane, and the like. Aromatic nitro compounds include, for example, nitrobenzene, o-, m-, or p-dinitrobenzene, trinitrobenzene, o-, m-, or p-nitrotoluene, o-, m-, or p-ethylnitrobenzene, 2,3-, 2,4-, 2,5-, 2,6-, 3,4-, or 3,5-dimethylnitrobenzene, o-, m-, or p-nitroacetophenone, o-, m-, or p-nitrophenol, o-, m-, or p-nitroanisole, and the like.

Epoxy compounds include, for example, mono-epoxy compounds such as ethylene oxide, 1,2-butylene oxide, propylene oxide, styrene oxide, cyclohexene oxide, glycidol, epichlorohydrin, glycidyl methacrylate, phenyl glycidyl ether, allyl glycidyl ether, methyl glycidyl ether, butyl glycidyl ether, and 2-ethylhexyl glycidyl ether, polyepoxy compounds such as diepoxy butane, vinyl cyclohexene dioxide, neopentyl glycol diglycidyl ether, ethylene glycol diglycidyl ether, glycerol polyglycidyl ether, and trimethylolpropane triglycidyl ether, and the like.

Phenols include, for example, in addition to phenol, aromatic compounds including substituents such as an alkyl group, an alkenyl group, an alkoxy group, a carboxyl group, a carbonyl group, and halogen along with a phenolic hydroxyl group. Such aromatic compounds include, for example, mono-valent phenols such as 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, butylhydroxyanisole, phenol, and xylenol, divalent phenols such as t-butylcatechol, 2,5-di-t-butylhydroquinone, 2,5-di-t-aminohydroquinone, and 2,5-di-t-butylhydroquinone.

Imidazoles include 1-methylimidazole, 1-n-butylimidazole, 1-phenylimidazole, 1-benzylimidazole, 1-(β-oxyethyl) imidazole, 1-methyl-2-propylimidazole, 1-methyl-2-isobutylimidazole, 1-n-butyl-2-methylimidazole, 1,2-dimethylimidazole, 1,4-dimethylimidazole, 1,5-dimethylimidazole, 1,2,5 trimethylimidazole, 1,4,5-trimethylimidazole, 1-ethyl-2-methylimidazole, and the like, which have a linear or branched alkyl group, a cycloalkyl group, or an aryl group of carbon number 1 to 18 at the N-position as a substituent.

Amines include pentylamine, hexylamine, diisopropylamine, diisobutylamine, di-n-propylamine, diallylamine, triethylamine, N-methylaniline, pyridine, morpholine, N-methylmorpholine, triallylamine, allylamine, α-methylbenzylamine, methylamine, dimethylamine, trimethylamine, ethylamine, diethylamine, propylamine, isopropylamine dipropylamine, butylamine, isobutylamine, dibutylamine, tributylamine, dipentylamine, tripentylamine, 2-ethylhexylamine, aniline, N,N-dimethylaniline, N,N-diethylaniline, ethylenediamine, propylenediamine, diethylenetriamine, tetraethylenepentamine, benzylamine, dibenzylamine, diphenylamine, diethylhydroxylamine, and the like.

Hydrocarbons include α-methylstyrene, p-isopropenyltoluene, isoprenes, propadienes, terpenes, and the like.

4-3. Flame Retardant

An embodiment of the present invention is a composition containing this multi-component composition and a flame retardant. The addition of a flame retardant reduces the flammability of this multi-component composition, thereby improving safety. Such flame retardants include, but are not limited to, phosphate esters, halogenated aromatic compounds, fluorinated iodocarbons, fluorinated bromocarbons, and the like. The amount of the flame retardant may be selected from, but is not limited to, 0.01 mass % to 20 mass %, 0.01 mass % to 10 mass %, or 0.01 mass % to 5 mass % of this multi-component composition, for example.

4-4. Surfactant

An embodiment of the present invention is a composition containing this multi-component composition and a surfactant. The addition of a surfactant can further improve the cleaning ability and interfacial action. Such surfactants include nonionic surfactants exemplified by: sorbitan aliphatic esters such as sorbitan monooleate and sorbitan trioleate; polyoxyethylene sorbitol aliphatic acid esters such as sorbitol tetraoleate of polyoxyethylene; polyoxyethylene glycol aliphatic acid esters such as polyoxyethylene monolaurate; polyoxyethylene alkyl ethers such as polyoxyethylene lauryl ether; polyoxyethylene alkyl phenyl ethers such as polyoxyethylene nonylphenyl ether; polyoxyethylene alkylamine aliphatic acid amides such as polyoxyethylene oleic acid amides. For the purpose of synergistically improving cleaning ability and interfacial action, the composition of the present invention may contain cationic or anionic surfactants along with these nonionic surfactants. The amount of surfactant may be selected from, for example, but not limited to, 0.01 mass % to 20 mass %, 0.01 mass % to 10 mass %, or 0.01 mass % to 5 mass % of this multi-component composition.

4-5. Metal Passivator

An embodiment of the present invention is a composition containing this multi-component composition and a metal passivator. The metal passivator may include a corrosion inhibitor and/or a metal deactivator. The metal passivator may be useful for preventing corrosion of metals included on surfaces of articles with which this multi-component composition may come in contact. Various metal passivators are well known in the art and any of the metal passivators may be used as the additives of this multi-component composition. The amount of metal passivator may be selected, for example, but not limited to, from 0.01 mas % to 20 mas %, from 0.01 mas % to 10 mas %, or from 0.01 mas % to 5 mas % of this multicomponent composition.

4-6. Organic Solvent

An embodiment of the present invention is a composition containing this multi-component composition and an organic solvent. The addition of an organic solvent can further improve the cleaning ability and the like of this multi-component composition. Examples of such organic solvents include, but are not limited to, the following.

Alcohols such as methanol, ethanol, n-propyl alcohol, isopropyl alcohol, n-butanol, and pentafluoropropanol;
hydrocarbons such as pentane, hexane, isopentane, n-heptane, cyclopentane, and cyclohexane;
petroleum paraffins;
alkylbenzenes such as toluene and xylene;
ketones such as acetone and methyl ethyl ketone;
esters such as ethyl acetate;
glycol ethers such as diethylene glycol monobutyl ether;
naphthas such as light naphtha, heavy naphtha, petroleum naphtha, and coal tar naphtha;
chlorinated solvents such as methylene chloride, trichloroethane, trichloroethylene, tetrachloroethylene, and E-1,2-dichloroethylene;
hydrochlorofluorocarbons such as dichlorofluoroethane, dichlorodifluoroethane, dichlorotrifluoroethane, chlorofluoropropane, chlorodifluoropropane, chlorotrifluoropropane, chlorotetrafluoropropane (except for 244fa), dichlorofluoropropane, dichlorodifluoropropane, dichlorotrifluoropropane, dichlorotetrafluoropropane, dichloropentafluoropropane, trichlorofluoropropane, trichlorodifluoropropane; and trichlorotrifluoropropane;
hydrofluorocarbons such as fluoropropane, difluoropropane, trifluoropropane, tetrafluoropropane, pentafluoropropane, hexafluoropropane, fluorobutane, difluorobutane, trifluorobutane, tetrafluorobutane, pentafluorobutane, hexafluorobutane, heptafluorobutane, octafluorobutane, nonafluorobutane, fluoropentane, difluoropentane, trifluoropentane, tetrafluoropentane, pentafluoropentane, hexafluoropentane, heptafluoropentane, octafluoropentane, nonafluoropentane, decafluoropentane, and undecafluoropentane;
hydrohaloolefins such as Z-1-chloro-2,3,3-trifluoro-1-propene (HCFO-1233yd(Z)), E-1-chloro-2,3,3-trifluoro-1-propene (HCFO-1233yd(E)), Z-1,2-dichloro-3,3,3-trifluoropropene (HCFO-1223xd(Z)), E-1,2-dichloro-3,3,3-trifluoropropene (HCFO-1223xd(E)), 1,1-dichloro-3,3,3-trifluoropropene (HCFO-1223za), 1,1,2-trichloro-3,3,3-trifluoropropene (HCFO-1213xa), Z-1,1,1,4,4,4-hexafluoro-2-butene (HFO-1336mzz(Z)), E-1-chloro-2,3,3,4,4,5,5-heptafluoro-1-pentene (HCFO-1437dycc(E)), Z-1-chloro-2,3,3,4,4,5,5-heptafluoro-1-pentene (HCFO-1437dycc(Z)), Z-1,1,1,2,4,4,5,5,5-nonafluoro-2-pentene (HFO-1429myz(Z)), E-1,1,1,2,4,4,5,5,5-nonafluoro-2-pentene (HFO-1429myz(E)), Z-1,1,1,3,4,4,5,5,5-nonafluoro-2-pentene (HFO-1429mzy(Z)), E-1,1,1,3-4,4,5,5,5-nonafluoro-2-pentene (HFO-1429mzy(E)), Z-1-chloro-2,3,3,3-tetrafluoropropene (HCFO-1224yd(Z)), E-1-chloro-2,3,3,3-tetrafluoropropene (HCFO-1224yd(E), Z-2-chloro-1,3,3,3-tetrafluoropropene (HCFO-1224xe(Z)), E-2-chloro-1,3,3,3-tetrafluoropropene (HCFO-1224xe(E)), 2-chloro-3,3,3-trifluoropropene (HCFO-1233xf), and methoxyperfluoroheptene;

hydrofluoroethers such as heptafluoropropyl methyl ether, nonafluorobutyl methyl ether, nonafluorobutyl ethyl ether, 1,1,1,2,2,3,4,5,5,5-decafluoro-3-methoxy-4-(trifluoromethyl)pentane, 1,1,2,2-tetrafluoroethyl-2,2,2-trifluoroethyl ether (HFE-347pc-f), 1,1,1,3,3,3,3-hexafluoro-2-methoxypropane (HFE-356mmz);

hydrofluoroketones such as 3,3,4,4-tetrafluoro-2-butanone (HFK-354pc), 1,1,1,2,2-pentafluoro-3-pentanone (HFK-465mc), 3,3,4,4,5,5,5-heptafluoro-2-pentanone (HFK-447mcc), 3,4,4,4-tetrafluoro-3-(trifluoromethyl)-2-butanone (HFK-447mmy), 3,3,4,4,5,5,6,6,6-nonafluoro-2-hexanone (HFK-549mccc), and 3,3,4,4,5,5,6,6,7,7,7-undecafluoro-2-heptanone (HFK-64-11 mccc); and perfluoroketones such as 1,1,1,2,2,4,5,5,5-nonafluoro-4-(trifluoromethyl)-3-pentanone.

These solvents may be used alone or in combination with two or more of these solvents. The amount of organic solvent may be selected from, but not limited to, 0.01 mass % to 50 mass %, 0.01 mass % to 30 mass %, or 0.01 mass % to 10 mass % of this multi-component composition, for example.

4-7. Injection Gas

An embodiment of the present invention is a composition containing this multi-component composition and an injection gas. The inclusion of an injection gas provides an aerosol composition containing this multi-component composition. Liquefied gas or compressed gas may be used as the injection gas. Examples include, but are not limited to, LPG (liquefied petroleum gas), DME (dimethyl ether), carbon dioxide gas, fluorinated gas, nitrogen gas, compressed air, and the like. These gases may be used alone or may be a mixture of two or more gases. Here, fluorinated gases refer to fluorine-containing hydrocarbon compounds which have a boiling point of less than 20° C. at 1 atm and which are gaseous at 20° C. at 1 atm. Fluorinated gases include, but are not limited to, hydrofluorocarbons such as difluoromethane (HFC-32), 1,1-difluoroethane (HFC-152a), 1,1,1,2-tetrafluoroethane (HFC-134a), 1,1,1,2,2-pentafluoroethane (HFC-125), and 1,1,1-trifluoroethane (HFC-143a), and hydrofluoroolenins such as E-1-chloro-3,3,3-trifluoropropene (HCFO-1233zd(E)), Z-1,3,3,3-tetrafluoropropene (HFO-1234ze(Z)), E-1,3,3,3-tetrafluoropropene (HFO-1234ze(E)), and 2,3,3,3-tetrafluoropropene (HFO-1234yf). The aerosol compositions can be provided by filling a pressure-resistant can with a composition containing this multi-component composition and an injection gas. When an injection gas is included, the volume ratio of this multi-component composition to the injection agent may be, but is not limited to, 0.01:99.99 to 99.99:0.01, or 0.1:99.9 to 99.9:0.1, for example.

5. Uses

Hereinafter, examples of uses of this multi-component composition are exemplified. Compositions containing this multi-component composition are also applicable to each of the applications exemplified below in the same manner as this multi-component composition.

5-1. Cleaning Application

Since this multi-component composition has excellent cleaning ability, it can be used as a cleaning agent. Although the field of use as a cleaning agent is not limited, the field in which CFC-113 (chlorotrifluoromethane), HCFC-141b (1,1-dichloro-1-fluoroethane), HCFC-225 (a mixture of 3,3-dichloro-1,1,1,2,2-pentafluoropropane (HCFC-225ca) and 1,3-dichloro-1,1,2,2,3-pentafluoropropane (HCFC-225cb)), and the like have been used as a cleaning agent is preferred.

Specifically, this multi-component composition is suitable for removing foreign matter, oil, grease, wax, flux, ink, and the like from articles to be cleaned such as precision machine parts, electronic materials (printed circuit boards, liquid crystal displays, magnetic recording parts, semiconductor materials, and the like), resin processed parts, optical lenses, and clothing. Since this multi-component composition has moderate fluidity and solubility, this multi-component can remove contaminants such as foreign matter by washing away or dissolving the contaminants. The materials of the base materials which structure these articles to be cleaned include metals such as iron, stainless steel, magnesium, aluminum, zinc, silver, copper, copper alloys, tin, anodized aluminum sulfate, and titanium; metals with surfaces plated with copper, zinc, nickel, chrome, gold, or the like; plastic materials such as polypropylene and an epoxy resin, polymer materials, glass materials, and the like.

The types of contaminants are also not limited, and stains which can be removed by CFC-113, HCFC-141b, or HCFC-225 can be removed by optimizing the composition ratio of this multi-component composition. Such contaminants include solid contaminants such as particles, or liquid contaminants such as oil, grease, wax, flux, and ink. Since this multi-component composition contains water which is a highly polar substance, these contaminants can be easily removed even if they contain highly polar substances such as water-soluble oil or inorganic salts.

Alternatively, this multi-component composition can also be suitably used for cleaning various vehicles such as automobiles, motorcycles, bicycles, construction machinery, agricultural machinery, aircraft, railroad vehicles, and ships and transportation engines (especially brake cleaning for these engines). Although a process of wetting and washing off contaminants may be required in the cleaning of vehicles and transportation engines, it is possible to wet and wash off the contaminants because this multi-component composition has high affinity to the contaminants.

The method of cleaning is not particularly limited, and it is sufficient to bring the multi-component composition into contact with the articles to be cleaned. For example, the articles to be cleaned are immersed in the multi-component composition. Alternatively, the multi-component composition may be sprayed onto the articles to be cleaned. Alternatively, the contaminant on the articles to be cleaned may be wiped off with a rag impregnated with the multi-component composition. In the case of immersing, ultrasonic waves may be applied. In the case of spraying, an aerosol containing this multi-component composition and an injection gas may be used, for example.

As described above, this multi-component composition exhibits an azeotropic-like phenomenon. Therefore, even when this multi-component composition is used in an open system, negligible fluctuation in the composition occurs, and stable cleaning ability can be achieved without strict composition control. In addition, this multi-component composition can be recovered from the cleaning effluent after cleaning and reused as a cleaning agent by purification such as distillation. In general, cleaning agents obtained by distillation recovery from cleaning effluent often differ in composition from the original cleaning solution, which may cause a decrease in cleaning ability. On the other hand, since this multi-component composition exhibits an azeotropic-like phenomenon, the composition of the cleaning agent hardly changes even after distillation, and the reused product is able to exhibit stable cleaning ability.

Moreover, hydrochlorofluoroolefins and hydrochlorofluorocarbons such as 1233zd(Z), 244fa, and 1214 included in this multi-component composition have a high ability to dissolve organic compounds and are useful as cleaning agents to remove lipophilic contaminants adhering to the surface of articles to be cleaned. However, when the polarity of the contaminants is high, for example, when the contaminants are highly polar substances such as water-soluble oils or inorganic salts, it is difficult to completely remove the contaminants with a cleaning agent consisting only of hydrochlorofluoroolefins and/or hydrochlorofluorocarbons because these contaminants are sparingly soluble in hydrochlorofluoroolefins and hydrochlorofluorocarbon.

However, since this multi-component composition contains water in addition to the hydrochlorofluoroolefin and hydrochlorofluorocarbon, it is effective in removing highly polar substances adhering to the surface of the article to be cleaned. In addition, water evaporates together with the hydrochlorofluoroolefin and hydrochlorofluorocarbons because this multi-component composition, which remains on the surface of the article to be cleaned after cleaning, shows azeotropic properties. Therefore, water does not remain on the surface of the article, and, at the same time, it is possible to prevent generation of water spotting (water stain, water mark), which is a problem when using compositions containing water as a cleaning agent.

5-2. Draining Application

This multi-component composition can be used as a draining agent. Articles handled in a variety of industrial fields such as automobiles, machinery, precision equipment, electricity, electronics, and optics are cleaned with water such as pure water or with water-based cleaning agents, quasi-aqueous cleaning agents in which water-based cleaning agents are blended with water-soluble solvents, alcohol-based cleaning agents, glycol ether-based cleaning agents, hydrocarbon-based cleaning agents in which hydrocarbons are blended with surfactants, and the like in the manufacturing process. When aqueous cleaning agents or quasi-aqueous cleaning agents are used, water adheres to the article after cleaning, and a draining process is generally performed to eliminate the water with a draining agent after the cleaning process. This multi-component composition can also be suitably used as a draining agent for such a draining process.

The draining method is not particularly limited, and any conventionally known method can be employed. For example, the method in which the article to be drained is brought into contact with this multi-component composition and then dried is represented.

Since this multi-component composition exhibits a draining action as well as a cleaning action, the cleaning process and the draining process can be performed simultaneously. That is, it is possible to remove contaminants adhered to the articles to be cleaned and remove water which may be attached to the cleaned article by performing the cleaning process. Therefore, productivity is improved because it is not necessary to separately use the cleaning agent and the draining agent in the cleaning process and the draining process. This feature does not preclude the separate use of the cleaning agents and the draining agents used in the washing process and the draining process, and this multi-component composition may be used as a cleaning agent and/or a draining agent in the respective processes. As described above, since this multi-component composition contains water, it is suitable for cleaning articles to be cleaned to which water-containing contaminants such as water-soluble oil are adhered, and water can be removed together with the contaminants adhered to the articles to be cleaned. It is also possible to prevent the generation of water droplet spots.

5-3. Solvent (Dispersant) Application

Since this multi-component composition exhibits an azeotropic-like phenomenon, it can be used as a solvent or dispersant similar to a single-component composition. For example, this multi-component composition has excellent properties as a solvent or dispersant for silicone, polytetrafluoroethylene powder (PTFE powder), fluorinated grease, and the like and can be used as a nonflammable, highly volatile solvent capable of dissolving or dispersing various types of silicone. Since this multi-component composition has a wide azeotropic-like composition range, the optimum composition can be selected according to various silicone compounds, PTFE powder, and fluorinated grease.

By using this multi-component composition as a solvent or dispersant for a component for forming coating films of silicone, PTFE powder, fluorinated grease, and the like, surface coating of articles can be performed. Specifically, a solution containing this multi-component composition and a component for forming a coating film is applied onto a surface of an article and then the multi-component composition is vaporized, thereby forming a coating film of the component for forming a coating film on the surface of the article. Surface materials of the article to which this method can be applied include metal, resin, ceramics, glass, and the like, and, in particular, this method can be preferably applied to coat a needle tube part of a syringe needle, a spring or a spring part of a dispenser (liquid metering dispenser), and the like. For example, when forming a silicone coating on a needle tube part of a syringe needle, the needle tube part of the syringe needle may be immersed in a silicone coating solution and then left at room temperature or under heating to allow this multi-component composition to evaporate.

In the surface coating, it is possible to use various types of silicone including straight silicone oil such as dimethyl silicone oil, methyl phenyl silicon oil, and methyl hydrogen silicon oil having a methyl group, a phenyl group, and/or a hydrogen atom as substituents on silicon and modified silicon oil such as reactive silicone oil and non-reactive silicone oil having components derived from the straight silicone oil. The reactive silicones may also be, but not limited to, amino-modified, diamino-modified, epoxy-modified, carboxy-modified, carbinol-modified, methacryl-modified, mercapto-modified, phenolic-modified, hydroxy-modified, and different functional group modified silicone, for example. Non-reactive silicones may be, but not limited to, polyether-modified, methylstyryl-modified, alkyl-modified, aliphatic acid ester-modified, hydrophilic-specially modified, aliphatic acid-containing, and fluorine-modified silicone, for example.

Other silicones include those mainly composed of a copolymer of an aminoalkylsiloxane and dimethylsiloxane, those mainly composed of reaction products of an amino group-containing silane with an epoxy group-containing silane and a polydiorganosiloxane containing silanol groups, a silicon mixture consisting of a silicone having an amino group in a side chain or at a terminal and a polydiorganosiloxane, a mixture of a silicone obtained by reacting an amino group-containing alkoxysilane, an epoxy group-containing alkoxysilane, and a silicone having silanol groups at both terminals and non-reactive silicone, and the like.

The proportion of the component for forming the coating film in the solution containing this multi-component composition and the component for forming the coating film may be from 0.1 mass % to 20 mass %, and is preferred to be from 0.5 mass % to 10 mass %.

5-4. Foaming Agent Application

This multi-component composition can be used as a foaming agent for the production of rigid polyurethane foam or polyisocyanurate foam. That is, rigid polyurethane foam or polyisocyanurate foam can be produced by using a composition (premix) of this multi-component composition as a foaming agent, one or more polyols, a catalyst, a foaming conditioner, a flame retardant, and the like and reacting the composition with an isocyanate. The premix may further contain UV inhibitors, anti-scorch agents, premix storage stabilizers, and the like, by which the various properties of the rigid polyurethane foam or polyisocyanurate foam can be improved.

Isocyanates include aromatic isocyanates, cyclic aliphatic isocyanates, and chained aliphatic isocyanates, and bifunctional isocyanates are generally used. Specifically, polyisocyanates such as tolylene diisocyanate, diphenylmethane diisocyanate, polymethylene polyphenyl polyisocyanate, tolylene diisocyanate, naphthalene diisocyanate, hexamethylene diisocyanate, isophorone diisocyanate, xylylene diisocyanate, hydrogenated xylylene diisocyanate, and dicyclohexylmethane isocyanate as well as prepolymer-type modified, nullate-modified, or urea-modified forms thereof are exemplified. These isocyanates are used alone or as a mixture.

Polyols include polyether-based polyols, polyester-based polyols, polyhydric alcohols, diethylene-based polymers containing hydroxyl groups, and the like, and polyether-based polyols are generally used. Furthermore, polyester-based polyols and polyether-based polyols may be used as the main component, and other polyols may also be used.

Polyester-based polyols include condensed polyester-based polyols, lactone-based polyester polyols, and polycarbonate polyols in addition to phthalic anhydride, waste polyesters, and compounds derived from castor oil. From the viewpoint of compatibility with this multi-component composition as well as foaming and foam properties, the hydroxyl group value (OH value) of the polyester polyol is preferred to be equal to or higher than 100 mgKOH/g and equal to or lower than 400 mg KOH/g, and the viscosity of the polyester polyol is preferred to be equal to or higher than 200 Pa-s/25° C. and equal to or lower than 4000 mPa-s/25° C.

Polyether-based polyols include sugars and polyhydric alcohols in addition to polypropylene glycol, polytetramethylene glycol, and their modified forms. Alternatively, products obtained by polymerizing cyclic ethers such as propylene oxide, ethylene oxide, epichlorohydrin, and butylene oxide using a compound containing an active hydrogen such as an alkanolamine as an initiator are preferably used. As the polyether-based polyols, those having a hydroxyl group value equal to or higher than 400 mgKOH/g and equal to or lower than 1000 mgKOH/g may be used.

As the catalysts, organometallic catalysts and organoamine catalysts are exemplified. As the organometallic catalysts, organotin compounds are preferably used, and stannous octoate, stannous laurate, dibutyl tin dilaurate, dibutyl tin dimarate, dibutyl tin diacetate, dioctyl tin diacetate, and the like are represented. The organic amine catalysts include tertiary amines exemplified by triethylenediamine, N-ethylmorpholine, bis(2-dimethylaminoethyl) ether, N,N',N'-triethylethanolamine, and the like.

Surfactants of organosilicon compound-based may be used as the foaming agent, and SH-193, SH-195, SH-200, and SRX-253 manufactured by Toray Silicone Co., F-230, F-305, F-341, and F-348 manufactured by Shin-Etsu Silicone Co., L-544, L-5310, L-5320, L-5420, and L-5720 manufactured by Nippon Unicar Co. Ltd., TFA-4200 and TFA-4202 manufactured by Toshiba Silicones Co., and the like are represented.

The flame retardants are phosphate esters used in rigid polyurethane foam or polyisocyanurate foam, and tri(2-chloroethyl) phosphate, tri(2-chloropropyl) phosphate, tri(butoxyethyl) phosphate, trimethyl phosphate, triethyl phosphate, triphenyl phosphate, and tri(isopropyl)phenyl phosphate, and the like are represented.

5-5. Heat-Transfer Medium Application

This multi-component composition is suitable as a heat-transfer medium for refrigeration cycle systems, high-temperature heat pump systems, and organic Rankine cycle systems. In addition, this multi-component composition is also suitable as a cleaning agent for cleaning these systems.

A refrigeration cycle system is a vapor-compression type refrigeration cycle system including at least elemental components of an evaporator, a compressor, a condenser, and an expansion valve, and is primarily intended to perform cooling. The expansion valve is a device for throttle-expanding the heat-transfer medium and may be a capillary tube. In addition to the aforementioned elemental components, the refrigeration cycle system may also include an internal heat exchanger, a dryer, a liquid separator, an oil recovery unit, a non-condensable gas separator, and the like. The refrigeration cycle system may be used as a refrigerator, an air conditioning system, or a cooling system.

A high-temperature heat pump cycle system is a vapor-compression type heat pump cycle system including at least elemental components of an evaporator, a compressor, a condenser, and an expansion valve and is primarily intended to perform heating. The expansion valve is a device for throttle-expanding the heat-transfer medium and may be a capillary tube. In addition to the aforementioned elemental components, the high-temperature heat pump cycle system may include an internal heat exchanger, a dryer, a liquid separator, an oil recovery unit, a non-condensable gas separator, and the like. The high-temperature heat pump cycle system may be used as a water heating system, a steam generation system, or a heating system. The high-temperature heat pump cycle system may also use solar thermal energy or factory waste heat as a heat source.

An organic Rankine cycle system is a system including at least elemental components of an evaporator, an expander, a condenser, and a pressure booster pump, and is primarily intended to convert thermal energy into electrical energy. In addition to the aforementioned elemental components, the organic Rankine cycle system may also include an internal heat exchanger, a dryer, a liquid separator, an oil recovery unit, a non-condensable gas separator, and the like. The organic Rankine cycle system can be used as a power generation device to recover medium to low temperature heat. Furthermore, the organic Rankine cycle system may also use solar thermal energy or factory waste heat as a heat source.

EXAMPLES

Hereinafter, the results of the evaluation of the characteristics of this multi-component composition according to an embodiment of the present invention are explained, but the invention is not to be interpreted as limited to the following examples. In the following Examples 1 to 4, the results are demonstrated to confirm that the three-component composition consisting of 1233zd(Z), 244fa, and water forms an azeotropic-like composition. In Examples 5 through 9, the results are demonstrated to confirm that the four-component composition consisting of 1233zd(Z), 244fa, 1214xb, and water forms an azeotropic-like composition. In Example 10, the results are demonstrated to confirm that the three-component composition and the four-component composition according to an embodiment of the present invention exhibits a draining action as well as a cleaning action. Note that 1214xb used in Examples 5 through 10 has a cis:trans ratio of 57:43.

1. Example 1

A 300-mL three-necked round-bottomed flask equipped with a condenser at the top was fitted with a high-precision thermometer (manufactured by Chino Corporation, main unit model: CAB-F201-2, a practical standard platinum resistance thermometer: R900-F25AD), and the inner pressure of the three-necked round-bottomed flask was set to be the outside air pressure while maintaining a state where outside moisture does not enter from the top of the condenser. A standard sample 1 prepared by mixing 60.62 mass % of 1233zd(Z) and 39.38 mass % of 244fa was added to a 200-mL flask, and the standard sample 1 was heated while stirring thoroughly. The temperature at which the standard sample 1 was completely boiled and the sample temperature was stabilized was measured as a "read boiling point," and the outside air pressure at this point was measured using a barometer (Sanoh Corporation, high-precision digital barometer VR-16NK). The read boiling point was converted to the standard boiling point on the basis of the outside air pressure. The conversion of the boiling point was performed by obtaining a correction value using the Sidney Young formula described in the barometric correction method for thermometer readings in the Japanese Industrial Standard: JIS K2254 "Distillation Methods for Petroleum Products" and adding the correction value to the read boiling point. As a result, the standard boiling point of the standard sample 1 was 39.70° C. The standard boiling points of samples 1 through 3 prepared by adding a predetermined amount of water to the standard sample 1 were each determined by the method described above. The results are shown in Table 1. The composition ratio of 1233zd(Z) to 244fa was the same in the standard sample 1 and samples 1 to 3.

TABLE 1

Standard boiling points of standard sample 1 and samples 1 to 3

|  | 1233zd(Z) (wt %) | 244fa (wt %) | Water (wt %) | Standard boiling point (° C.) |
|---|---|---|---|---|
| Standard sample 1 | 60.62 | 39.38 | — | 39.70 |
| Sample 1 | 60.61 | 39.38 | 0.01 | 39.64 |

TABLE 1-continued

Standard boiling points of standard sample 1 and samples 1 to 3

|  | 1233zd(Z) (wt %) | 244fa (wt %) | Water (wt %) | Standard boiling point (° C.) |
|---|---|---|---|---|
| Sample 2 | 60.58 | 39.36 | 0.06 | 39.66 |
| Sample 3 | 60.02 | 38.99 | 0.99 | 39.05 |

As shown in Table 1, it was observed that the samples 1 to 3 all exhibit lower standard boiling points than the standard boiling point of the standard sample 1. This suggests that each of the samples 1 to 3 forms a three-component azeotropic-like composition.

2. Example 2

The standard boiling point of a standard sample 2 prepared by mixing 90.91 mass % of 1233zd(Z) and 9.09 mass % of 244fa was determined by the same method as that of Example 1 to be 39.31° C. The standard boiling points of samples 4 through 6 prepared by adding a predetermined amount of water to the standard sample 2 were each determined by the aforementioned method. The results are shown in Table 2. The composition ratio of 1233zd(Z) to 244fa was the same in the standard sample 2 and the samples 4 to 6.

TABLE 2

Standard boiling points of standard sample 2 and samples 4 to 6

|  | 1233zd(Z) (wt %) | 244fa (wt %) | Water (wt %) | Standard boiling point (° C.) |
|---|---|---|---|---|
| Standard sample 2 | 90.91 | 9.09 | — | 39.31 |
| Sample 4 | 90.89 | 9.09 | 0.02 | 39.28 |
| Sample 5 | 90.86 | 9.09 | 0.06 | 39.24 |
| Sample 6 | 90.01 | 9.00 | 0.99 | 37.79 |

As shown in Table 2, it was observed that the samples 4 to 6 all exhibit lower standard boiling points than the standard boiling point of the standard sample 2. This suggests that each of the samples 4 to 6 forms a three-component azeotropic-like composition.

3. Example 3

The standard boiling point of a standard sample 3 prepared by mixing 99.18 mass % of 1233zd(Z) and 0.82 mass % of 244fa was determined by the same method as that of Example 1 to be 39.21° C. The standard boiling points of samples 7 and 8 prepared by adding a predetermined amount of water to the standard sample 3 were each determined by the aforementioned method. The results are shown in Table 3. The composition ratio of 1233zd(Z) to 244fa was the same in the standard sample 3 and the samples 7 and 8.

TABLE 3

Standard boiling points of standard sample 3 and samples 7 and 8

|  | 1233zd(Z) (wt %) | 244fa (wt %) | Water (wt %) | Standard boiling point (° C.) |
|---|---|---|---|---|
| Standard sample 3 | 99.18 | 0.82 | — | 39.21 |
| Sample 7 | 99.08 | 0.82 | 0.1 | 39.06 |
| Sample 8 | 98.19 | 0.81 | 1.01 | 37.88 |

As shown in Table 3, it was observed that the samples 7 and 8 both exhibit lower standard boiling points than the standard boiling point of the standard sample 3. This suggests that each of samples 7 and 8 forms a three-component azeotropic-like composition.

4. Example 4

The standard boiling point of a standard sample 4 prepared by mixing 99.97 mass % of 1233zd(Z) and 0.03 mass % of 244fa was determined by the same method as that of Example 1 to be 39.24° C. The standard boiling points of samples 9 and 10 prepared by adding a predetermined amount of water to the standard sample 4 were each determined by the aforementioned method. The results are shown in Table 4. The composition ratio of 1233zd(Z) to 244fa was the same in the standard sample 4 and the samples 9 and 10.

TABLE 4

Standard boiling points of standard sample 4 and samples 9 and 10

|  | 1233zd(Z) (wt %) | 244fa (wt %) | Water (wt %) | Standard boiling point (° C.) |
|---|---|---|---|---|
| Standard sample 4 | 99.97 | 0.03 | — | 39.24 |
| Sample 9 | 99.92 | 0.03 | 0.06 | 39.20 |
| Sample 10 | 98.98 | 0.03 | 0.99 | 37.72 |

As shown in Table 4, it was observed that the samples 9 and 10 both exhibit lower standard boiling points than the standard boiling point of the standard sample 4. This suggests that each of the samples 9 and 10 forms a three-component azeotropic-like composition.

5. Example 5

A standard sample 5 consisting of 99.9631 mass % of 1233zd(Z), 0.0044 mass % of 244fa, and 0.0325 mass % of 1214xb was put into a 50 mL three-necked round-bottomed flask, and its standard boiling point was determined by the same method as that of Example 1 to be 39.07° C. The standard boiling point of a sample 11 prepared by adding a predetermined amount of water to the standard sample 5 was determined by the aforementioned method. The results are shown in Table 5. The composition ratio of 1233zd(Z), 244fa, and 1214xb was the same in the standard sample 5 and the sample 11.

TABLE 5

Standard boiling points of standard sample 5 and sample 11

|  | 1233zd(Z) (wt %) | 244fa (wt %) | 1214xb (wt %) | Water (wt %) | Standard boiling point (° C.) |
|---|---|---|---|---|---|
| Standard sample 5 | 99.9631 | 0.0044 | 0.0325 | — | 39.24 |
| Sample 11 | 99.8909 | 0.0044 | 0.0325 | 0.0722 | 39.00 |

As shown in Table 5, it was observed that the sample 11 exhibits a lower standard boiling point than that of the standard sample 5. This suggests that sample 11 forms a four-component azeotropic-like composition.

6. Example 6

The standard boiling point of a standard sample 6 prepared by mixing 99.99389 mass % of 1233zd(Z), 0.00610 mass % of 244fa, and 0.00001 mass % of 1214xb was determined by the same method as that of Example 5 to be 39.07° C. The standard boiling points of samples 12 and 13 prepared by adding a predetermined amount of water to the standard sample 6 were each determined by the aforementioned method. The results are shown in Table 6. The composition ratio of 1233zd(Z), 244fa, and 1214xb was the same in the standard sample 6 and the samples 12 and 13.

TABLE 6

Standard boiling points of standard sample 6 and samples 12 and 13

|  | 1233zd(Z) (wt %) | 244fa (wt %) | 1214xb (wt %) | Water (wt %) | Standard boiling point (° C.) |
|---|---|---|---|---|---|
| Standard sample 6 | 99.99389 | 0.0061 | 0.00001 | — | 39.07 |
| Sample 12 | 99.97699 | 0.0061 | 0.00001 | 0.01690 | 39.06 |
| Sample 13 | 99.93293 | 0.0061 | 0.00001 | 0.06096 | 39.06 |

As shown in Table 6, it was observed that the samples 12 and 13 both exhibit lower standard boiling points than the standard boiling point of the standard sample 6. This suggests that each of the samples 12 and 13 forms a four-component azeotropic-like composition.

7. Example 7

The standard boiling point of a standard sample 7 prepared by mixing 99.9971 mass % of 1233zd(Z), 0.0026 mass % of 244fa, and 0.0001 mass % of 1214xb was determined by the same method as that of Example 5 to be 39.05° C. The standard boiling points of samples 14 and 15 prepared by adding a predetermined amount of water to the standard sample 7 were each determined by the aforementioned method. The results are shown in Table 7. The composition ratio of 1233zd(Z), 244fa, and 1214xb was the same in the standard sample 7 and the samples 14 and 15.

TABLE 7

Standard boiling points of standard sample 7 and samples 14 and 15

|  | 1233zd(Z) (wt %) | 244fa (wt %) | 1214xb (wt %) | Water (wt %) | Standard boiling point (° C.) |
|---|---|---|---|---|---|
| Standard sample 7 | 99.9971 | 0.0026 | 0.0001 | — | 39.05 |
| Sample 14 | 99.9184 | 0.0026 | 0.0001 | 0.0789 | 38.96 |
| Sample 15 | 98.8509 | 0.0026 | 0.0001 | 1.1464 | 38.46 |

As shown in Table 7, it was observed that the samples 14 and 15 both exhibit lower standard boiling points than the standard boiling point of the standard sample 7. This suggests that each of the samples 14 and 15 forms a four-component azeotropic-like composition.

8. Example 8

The standard boiling point of a standard sample 8 prepared by mixing 87.66 mass % of 1233zd(Z), 9.34 mass % of 244fa, and 3.00 mass % of 1214xb was determined by the same method as that of Example 5 to be 39.14° C. The standard boiling points of samples 16 and 17 prepared by adding a predetermined amount of water to the standard sample 8 were each determined by the aforementioned method. The results are shown in Table 8. The composition ratio of 1233zd(Z), 244fa, and 1214xb was the same in the standard sample 8 and the samples 16 and 17.

TABLE 8

Standard boiling points of standard sample 8 and samples 16 and 17

| | 1233zd(Z) (wt %) | 244fa (wt %) | 1214xb (wt %) | Water (wt %) | Standard boiling point (° C.) |
|---|---|---|---|---|---|
| Standard sample 8 | 87.66 | 9.34 | 3.00 | — | 39.14 |
| Sample 16 | 87.61 | 9.34 | 3.00 | 0.06 | 39.07 |
| Sample 17 | 86.78 | 9.25 | 2.97 | 1.00 | 37.97 |

As shown in Table 8, it was observed that the samples 16 and 17 both exhibit lower standard boiling points than the standard boiling point of the standard sample 8. This suggests that each of the samples 16 and 17 forms a four-component azeotropic-like composition.

9. Example 9

The standard boiling point of a standard sample 9 prepared by mixing 94.40 mass % of 1233zd(Z), 0.78 mass % of 244fa, and 4.82 mass % of 1214xb was determined by the same method as that of Example 5 to be 39.03° C. The standard boiling points of samples 18 and 19 prepared by adding a predetermined amount of water to the standard sample 9 were determined by the aforementioned method. The results are shown in Table 9. The composition ratio of 1233zd(Z), 244fa, and 1214xb was the same in the standard sample 9 and the samples 18 and 19.

TABLE 9

Standard boiling points of standard sample 9 and samples 18 and 19

| | 1233zd(Z) (wt %) | 244fa (wt %) | 1214xb (wt %) | Water (wt %) | Standard boiling point (° C.) |
|---|---|---|---|---|---|
| Standard sample 9 | 94.40 | 0.78 | 4.82 | — | 39.03 |
| Sample 18 | 94.33 | 0.78 | 4.82 | 0.07 | 38.98 |
| Sample 19 | 93.46 | 0.77 | 4.77 | 1.00 | 37.98 |

As shown in Table 9, it was observed that the samples 18 and 19 both exhibit lower standard boiling points than the standard boiling point of the standard sample 9. This suggests that each of the samples 18 and 19 forms a four-component azeotropic-like composition.

10. Example 10

A three-component composition was prepared by mixing 98.98 mass % of 1233zd(Z), 0.03 mass % of 244fa, and 0.99 mass % of water. Similarly, a four-component composition was prepared by mixing 99.93293 mass % of 1233zd(Z), 0.00610 mass % of 244fa, 0.00001 mass % of 1214xb, and 0.06096 mass % of water.

A 5 mass % aqueous solution of water-soluble processing oil Unisoluble EM (manufactured by JX Nippon Oil & Energy Corporation) was adhered to a test piece made of SUS316 with a 15 mm width, a 30 mm length, and a 2 mm thickness. This test piece was immersed in the above three-component composition and was subjected to ultrasonic cleaning at 25° C. for 2 minutes using an ultrasonic oscillator (Manufactured by Alex Corporation, NeoSonic, 100 W output, 28 kHz frequency. The same is applied below). The test piece was taken off and dried at 80° C. for 5 minutes, and the surface of the test piece was visually observed. As a result, neither stains nor water droplet points were observed, indicating that this three-component composition exhibits excellent cleaning and draining properties. The same experiment conducted using the above four-component composition exhibited the same results where no stains nor water droplet points were found, and it was confirmed that this four-component composition exhibited excellent washing and draining properties.

The same experiment was conducted using oil as the contaminant. That is, after measuring a dry weight of a glass rod (7.2 mm in diameter and 4 cm in length), the rod was immersed in the oil shown in Table 10 for 2 minutes. After that, the weight of the glass rod removed from the oil was measured to calculate the amount of oil adhered on the surface of the glass rod. Cleaning was performed by immersing the glass rod in the three-component or four-component composition and irradiating it with ultrasonic waves at 25° C. for 2 minutes using the ultrasonic oscillator. After the cleaned glass rod was dried, the glass rod was visually observed with a magnifying glass and the weight thereof was measured. The weight of the oil remaining on the glass rod was determined from the difference from the dry weight. The oil removal rate was calculated on the basis of the following formula.

Oil removal rate (%)=(weight of remaining oil/weight of the oil adhered on the glass rod)×100

TABLE 10

Oils used in Example 10

| Oils | Product Names |
|---|---|
| Cutting oil | Lubecut B-35 manufactured by Japan Energy Co., Ltd. |
| Turbine oil | Turbine oil manufactured by JX Nippon Oil & Energy Corporation, ISP viscosity grade 68 |
| Silicon oil A | KF54 manufactured by Shin-Etsu Chemical Co., Ltd. |
| Silicon oil B | KF96 manufactured by Shin-Etsu Chemical Co., Ltd. |

As a result, the oil removal rate was almost 100% for all oils listed in Table 10, and no residual oil was observed in the magnifying glass observation results. This indicates that the multi-component compositions according to an embodiment of the present invention show good properties as a cleaning agent.

What is claimed is:

1. A composition consisting of Z-1-chloro-3,3,3-trifluoropropene, 1-chloro-1,3,3,3-tetrafluoropropane, and water, wherein proportions of Z-1-chloro-3,3,3-trifluoropropene, 1-chloro-1,3,3,3-tetrafluoropropane, and water are 55.00 mass % to 99.98 mass %, 0.01 mass % to 44.99 mass %, and 0.01 mass % to 10.00 mass %, respectively, with respect to a total amount of Z-1-chloro-3,3,3-trifluoropropene, 1-chloro-1,3,3,3-tetrafluoropropane, and water.

2. The composition according to claim 1, wherein the proportions of Z-1-chloro-3,3,3-trifluoropropene, 1-chloro-1,3,3,3- and water are 60.00 tetrafluoropropane, mass % to 99.98 mass %, 0.01 mass % to 39.98 mass %, and 0.01 mass % to 5.00 mass %, respectively with respect to the total amount.

3. The composition according to claim 1,
wherein the proportions of Z-1-chloro-3,3,3-trifluoropropene, 1-chloro-1,3,3,3-tetrafluoropropane, and water are 85.00 mass % to 99.98 mass %, 0.01 mass % to 14.98 mass %, and 0.01 mass % to 2.00 mass %, respectively with respect to the total amount.

4. A composition consisting of Z-1-chloro-3,3,3-trifluoropropene, 1-chloro-1,3,3,3-tetrafluoropropane, dichlorotetrafluoropropene, and water,
wherein proportions of Z-1-chloro-3,3,3-trifluoropropene, 1-chloro-1,3,3,3-tetrafluoropropane, dichlorotetrafluoropropene, and water are 55.00000 mass % to 99.98989 mass %, 0.00010 mass % to 44.98999 mass %, 0.00001 mass % to 5.00000 mass %, and 0.01000 mass % to 10.00000 mass %, respectively, with respect to a total amount of Z-1-chloro-3,3,3-trifluoropropene, 1-chloro-1,3,3,3-tetrafluoropropane, dichlorotetrafluoropropene, and water.

5. The composition according to claim 4,
wherein the proportions of Z-1-chloro-3,3,3-trifluoropropene, 1-chloro-1,3,3,3-tetrafluoropropane, dichlorotetrafluoropropene, and water are 60.00000 mass % to 99.98989 mass %, 0.00010 mass % to 39.98999 mass %, 0.00001 mass % to 5.00000 mass %, and 0.01000 mass % to 5.00000 mass %, respectively, with respect to the total amount.

6. The composition according to claim 4,
wherein the proportions of Z-1-chloro-3,3,3-trifluoropropene, 1-chloro-1,3,3,3-tetrafluoropropane, dichlorotetrafluoropropene, and water are 85.00000 mass % to 99.98989 mass %, 0.00010 mass % to 14.98999 mass %, 0.00001 mass % to 5.00000 mass %, and 0.01000 mass % to 2.00000 mass %, respectively, with respect to the total amount.

7. The composition according to claim 4,
wherein dichlorotetrafluoropropene is 1,2-dichloro-1,3,3,3-tetrafluoropropene.

8. The composition according to claim 1,
wherein the composition is an azeotropic-like composition.

9. A cleaning agent containing the composition according to claim 1.

10. An aerosol composition containing the composition according to claim 1 and a compressed gas.

11. A mixture containing the composition according to claim 1, and at least one of a lubricant, a stabilizer, a flame retardant, a surfactant, a metal passivator, and an organic solvent.

12. A draining agent containing the composition according to claim 1.

13. A foaming agent containing the composition according to claim 1.

14. A heat-transfer medium containing the composition according to claim 1.

15. An organic Rankine cycle system using the heat-transfer medium according to claim 14.

16. A high-temperature heat pump cycle system using the heat-transfer medium according to claim 14.

17. A refrigeration cycle system using the heat-transfer medium according to claim 14.

18. A method for cleaning an article including bringing the composition according to claim 1 into contact with an article to be cleaned.

19. A method for forming a coating film of a component for forming a coating film on an article, the method comprising applying a solution containing the composition according to claim 1 and a component for forming a coating film on an article and evaporating the composition.

* * * * *